United States Patent
Sobel

(10) Patent No.: US 8,104,032 B1
(45) Date of Patent: *Jan. 24, 2012

(54) SYSTEM STATE ROLLBACK AFTER MODIFICATION FAILURE

(75) Inventor: William E. Sobel, Stevenson Ranch, CA (US)

(73) Assignee: Symantec Corporation, Mountain View, CA (US)

( * ) Notice: Subject to any disclaimer, the term of this patent is extended or adjusted under 35 U.S.C. 154(b) by 597 days.

This patent is subject to a terminal disclaimer.

(21) Appl. No.: 12/268,959

(22) Filed: Nov. 11, 2008

Related U.S. Application Data

(63) Continuation of application No. 10/775,471, filed on Feb. 9, 2004, now Pat. No. 7,467,378.

(51) Int. Cl.
*G06F 9/44* (2006.01)

(52) U.S. Cl. ........................................................ 717/168

(58) Field of Classification Search .......... 717/170–173, 717/168; 714/5.11, 13, 6.11, 15, 20; 713/1; 726/1; 709/221; 707/610, 999.01, 999.201
See application file for complete search history.

(56) References Cited

U.S. PATENT DOCUMENTS

| | | | |
|---|---|---|---|
| 6,205,558 B1 * | 3/2001 | Sobel | 714/15 |
| 6,519,762 B1 * | 2/2003 | Colligan et al. | 717/170 |
| 6,792,556 B1 * | 9/2004 | Dennis | 714/6.11 |
| 2003/0191911 A1 * | 10/2003 | Kleinschnitz et al. | 711/154 |
| 2005/0039076 A1 * | 2/2005 | Shoam | 714/20 |
| 2005/0080811 A1 * | 4/2005 | Speeter et al. | 707/102 |

OTHER PUBLICATIONS

Veritas Software Corp, "Configuring and Tuning Oracle Storage with Veritas Database Edition for Oracle", copyright 2001, pp. 1-16 <Veritas_Oracle_2001.pdf>.*

\* cited by examiner

*Primary Examiner* — Tuan Anh Vu
(74) *Attorney, Agent, or Firm* — Fenwick & West LLP

(57) ABSTRACT

A rollback manager creates a restore point on a computer. The rollback manager stores a reboot indicator in non-revertible storage. The rollback manager monitors the reboot indicator to detect an unexpected reboot during deployment of a modification. The rollback manager configures the computer responsive to the reboot indicator. The rollback manager can roll back the system state, responsive to detecting a failed modification deployment. The rollback manager can deem the computer to be stable, responsive to detecting a successful modification deployment.

12 Claims, 4 Drawing Sheets

SYSTEM STATE ROLLBACK AFTER MODIFICATION FAILURE

CROSS REFERENCE TO RELATED APPLICATIONS

This application is a continuation of U.S. application Ser. No. 10/775,471, filed Feb. 9, 2004, now issued as U.S. Pat. No. 7,467,378; which is incorporated by reference in its entirety.

TECHNICAL FIELD

This invention pertains generally to rolling back the system state of a computer, and more specifically to rolling back the system state after a failure occurs during the deployment of a modification.

BACKGROUND ART

System recovery utilities that can return a failed computer system to a healthy state currently exist. These recovery utilities store a restore point describing a healthy state in non-revertible storage, such that the computer can be returned to the restore point, even after a system crash. One example of a recovery utility is Symantec's Norton GoBack®. Another is Microsoft's SystemRestore®.

Modifications are often deployed on computer systems. For example, software patches containing bug fixes or improvements are frequently made available for existing computer software. Additionally, new software packages and new versions of existing packages are commonly released for installation on computer systems.

Because of the nature of software, it is often necessary to rollout modifications without having tested them in every possible target environment. Because users' computer configurations vary greatly, software patches and other modifications that have been thoroughly tested under controlled circumstances prior to deployment will still sometimes fail in the field, causing critical system failure or improper system function.

Failure of a deployed modification will often crash required applications or the computer itself, causing an unexpected reboot. However, the deployment of the modification itself will often require one or more legitimate reboots as part of the installation process.

When a deployed modification causes a system failure, it is desirable to restore the computer to the state it was in prior to the modification. However, because modifications often change a plurality of system settings, restoring the computer to its original state can be a complicated procedure.

What is needed are methods, computer readable media and systems that can accurately detect system failures caused by deployed modifications, and subsequently rollback the system to its pre-modification state.

DISCLOSURE OF INVENTION

The present invention comprises methods, systems, and computer readable media for rolling back (205) a system state after a modification (113) failure. A rollback manager (101) creates a restore point (105) on a computer (103). The rollback manager (101) stores a reboot indicator (111) in non-revertible storage (107). The rollback manager (101) monitors (201) the reboot indicator (111) to detect (111) an unexpected reboot during deployment of a modification (113). The rollback manager (101) configures the computer (103) responsive to the reboot indicator (111). In some embodiments, the rollback manager (101) rolls back (205) the system state, responsive to detecting a failed modification (113) deployment. In some embodiments, the rollback manager (101) deems (311) the computer to be stable, responsive to detecting a successful modification (113) deployment.

The features and advantages described in this disclosure and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Figure 1:
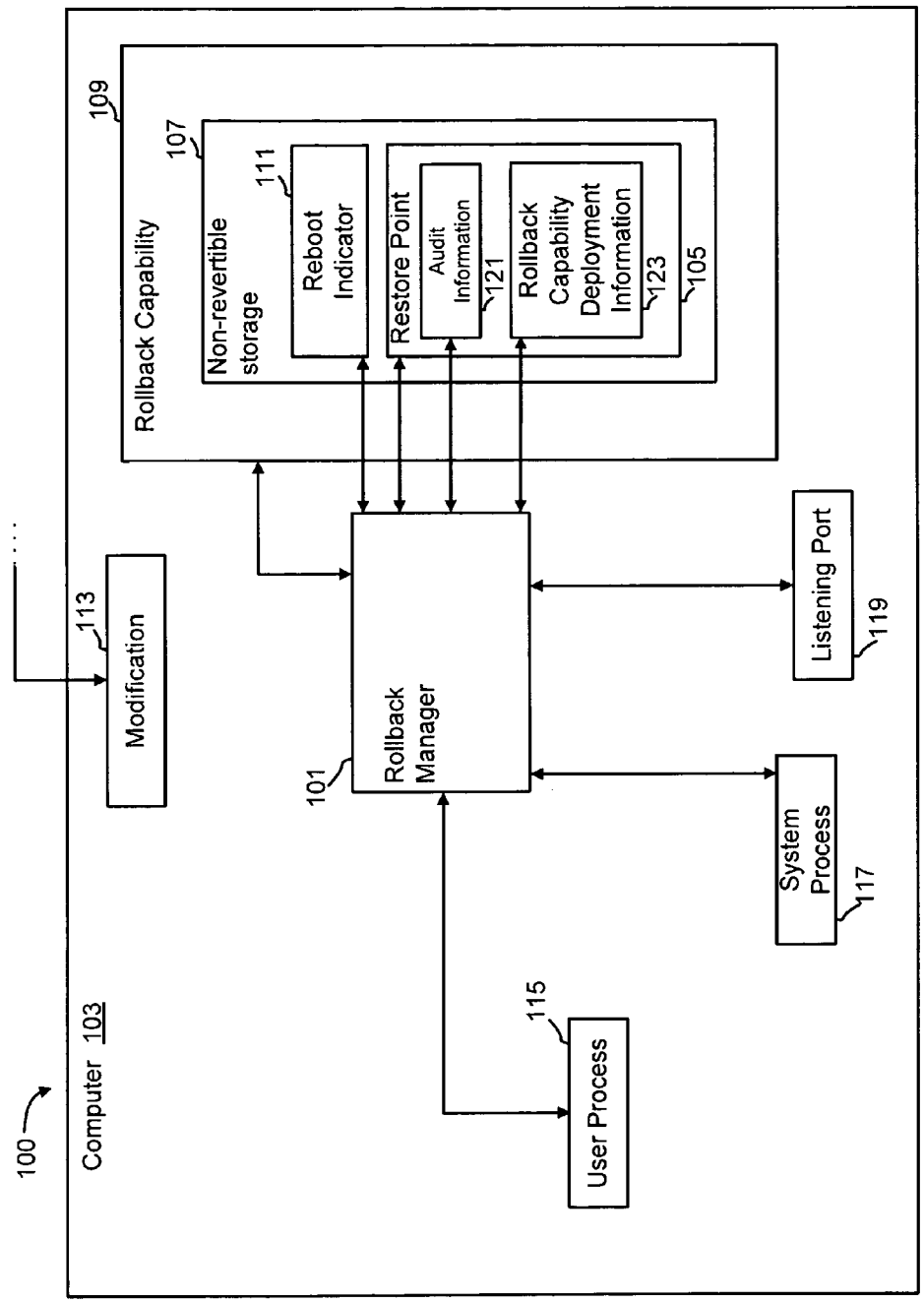
FIG. 1 is a block diagram illustrating a high level overview of a system for practicing some embodiments of the present invention.

FIG. 1 illustrates a high level overview of a system 100 for performing some embodiments of the present invention. A rollback manager 101 runs in a computer 103. It is to be understood that although the rollback manager 101 is illustrated as a single entity, as the term is used herein a rollback manager 101 refers to a collection of functionalities which can be implemented as software, hardware, firmware or any combination of the three. Where a rollback manager 101 is implemented as software, it can be implemented as a standalone program, but can also be implemented in other ways, for example as part of a larger program, as a plurality of separate programs, or as one or more statically or dynamically linked libraries.

The rollback manager 101 creates a restore point 105 describing a healthy state of the computer 103. Typically, the restore point 105 is stored in non-revertible storage 107. The implementation details of creating and storing a restore point 105 are known to those of ordinary skill in the relevant art. Note that although FIG. 1 illustrates the non-revertible storage 107 as being located within the rollback capability 109 of the computer 103, this need not be the case in all embodiments of the present invention. Rollback capability 109 is discussed in greater detail below.

The rollback manager 101 also stores a reboot indicator 111 in non-revertible storage 107. When a modification 113

(e.g., a software patch, a software update, a software installation or a reconfiguration of existing software) is deployed on the computer 103, the rollback manager 101 configures the reboot indicator 111 accordingly. The rollback manager 101 can configure the reboot indicator 111 to indicate that the modification 113 is to be deployed on the computer, and that the rollback manager 101 is monitoring the deployment.

In some instances, the deployment of the modification 113 is expected to reboot the computer 103. For example, the installation of a software patch often requires one or more reboots, which are typically performed by the installation program as needed. Where the deployment of the modification 113 is expected to reboot the computer 103, the rollback manager 101 configures the reboot indicator 111 to so indicate. Sometimes, the rollback manager 101 does not know in advance whether the deployment of the modification 113 is expected to reboot the computer 103. In such instances, the rollback manager 101 monitors the deployment of the modification 113, and configures the reboot indicator 111 to indicate that a reboot of the computer 103 is expected responsive to the deployment requesting a reboot (e.g., responsive to the install program making a system call to reboot the computer 103).

It is to be understood that the reboot indicator 111 can be implemented in any suitable format, such as one or more flags or other data structures, including in some embodiments an indication of whether a reboot is expected, a counter of expected legitimate reboots, a counter of executed reboots and/or an indication of whether a modification is being deployed and/or monitored. A variety of possible implementation formats for the reboot indicator 111 will be readily apparent to those of ordinary skill in the relevant art in light of this specification. Additionally, the implementation mechanics of monitoring deployments of modifications 113 are known to those of ordinary skill in the relevant art.

The rollback manager 101 monitors the reboot indicator 111 to detect unexpected reboots during the deployment of modifications 113 on the computer 103. Using techniques that will be readily apparent to those of ordinary skill in the relevant art in light of this specification, the rollback manager 101 reads the reboot indicator 111 after a reboot of the computer 103, before the booting of the operating system. Based on the status of the reboot indicator 111, the rollback manager 101 determines whether the reboot was legitimate.

Recall that the rollback manager 101 configures the reboot indicator 111 to indicate whether one or more reboots are expected during the deployment (e.g., by incrementing a counter). Thus, by reading the reboot indicator 111 immediately after a reboot, the rollback manager 101 can determine whether the reboot was expected during the deployment, or whether the deployment crashed the computer, thereby causing an unexpected reboot.

The rollback manager 101 proceeds to configure the computer 103 responsive to the status of the reboot indicator 111. For example, if the rollback manager 101 determines that the reboot was not legitimate, the rollback manager 101 can use the rollback capability 109 installed on the computer 103 to roll back the system state of the computer 103 according to the restore point 105. Because the deployment of the modification 113 failed, it is desirable to rollback the computer 103 to the system state it was in prior to the attempted deployment. On the other hand, if the rollback manager 101 determines that the reboot was legitimate, the rollback manager 101 can update the reboot indicator 111 to indicate the occurrence of the reboot. The rollback manager 101 can do this, for example, by decrementing a counter of expected reboots. The rollback manager 101 configuring the computer 103 responsive to the status of the reboot indicator 111 is discussed in greater detail below.

Figure 2:
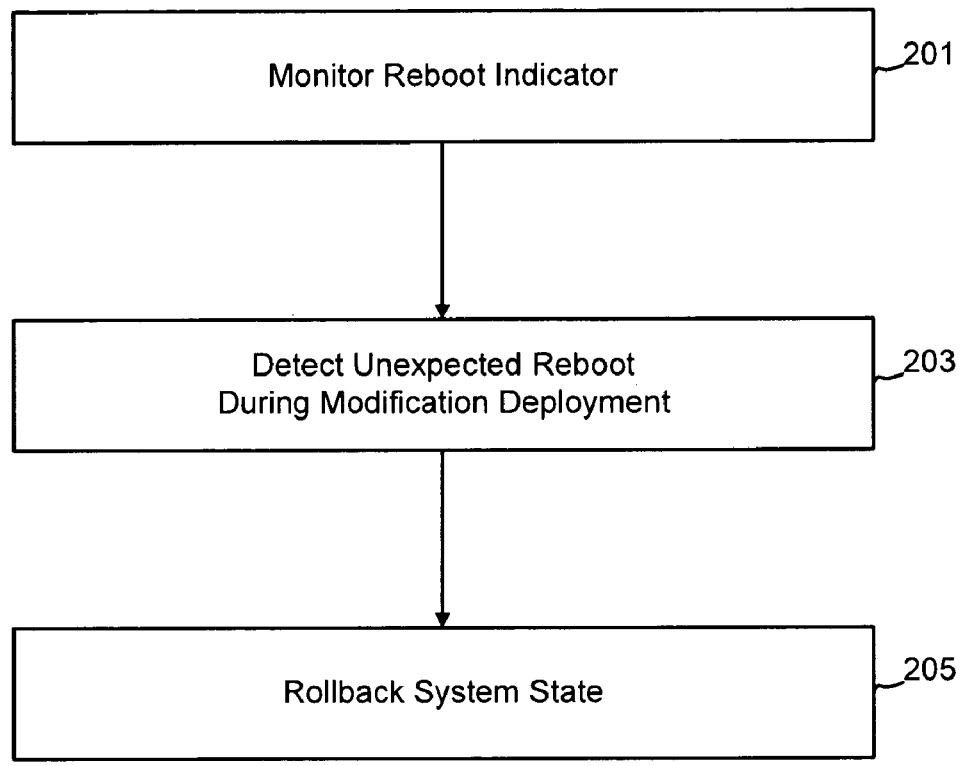
FIG. 2 is a flowchart illustrating steps for the rollback manager to respond to detection of an unexpected reboot, according to one embodiment of the present invention.

Turning to FIG. 2, the rollback manager 101 responding to detection of an unexpected reboot is illustrated, according to one embodiment of the present invention. The rollback manager 101 monitors 201 the reboot indicator 111 during the deployment of a modification 113, as described above. The rollback manager 101 detects 203 that an unexpected reboot occurred during the deployment of the modification 103, based on the status of the reboot indicator 111. In response, the rollback manager 101 rolls back 205 the system state of the computer 103, according to the restore point 105.

Returning to FIG. 1, in some embodiments of the present invention, the rollback manager 101 audits the computer 103, to determine which items of interest are present on thereon. The items of interest can be any items that are present prior to the deployment of a modification 113, and which are expected to be present thereafter. In some embodiments of the present invention, a system administrator or the like can specify which items are expected to be present after a deployment. If one or more items are not present after the deployment, it is an indication that the deployment was not successful. Which items are specifically audited is a design choice, and can include, for example, some or all executing user processes 115, some or all executing system processes 117 and/or some or all open listening ports 119. Other examples of possible items of interest will be apparent to those of ordinary skill in the relevant art in light of this specification.

In embodiments in which the rollback manager 101 audits the computer 103, the rollback manager 101 stores audit information 121 (e.g., a list of which items of interest are present). This audit information 121 can be stored as part of the restore point 105, as illustrated in FIG. 1, or separately in non-revertible storage 107 as desired.

Figure 3:
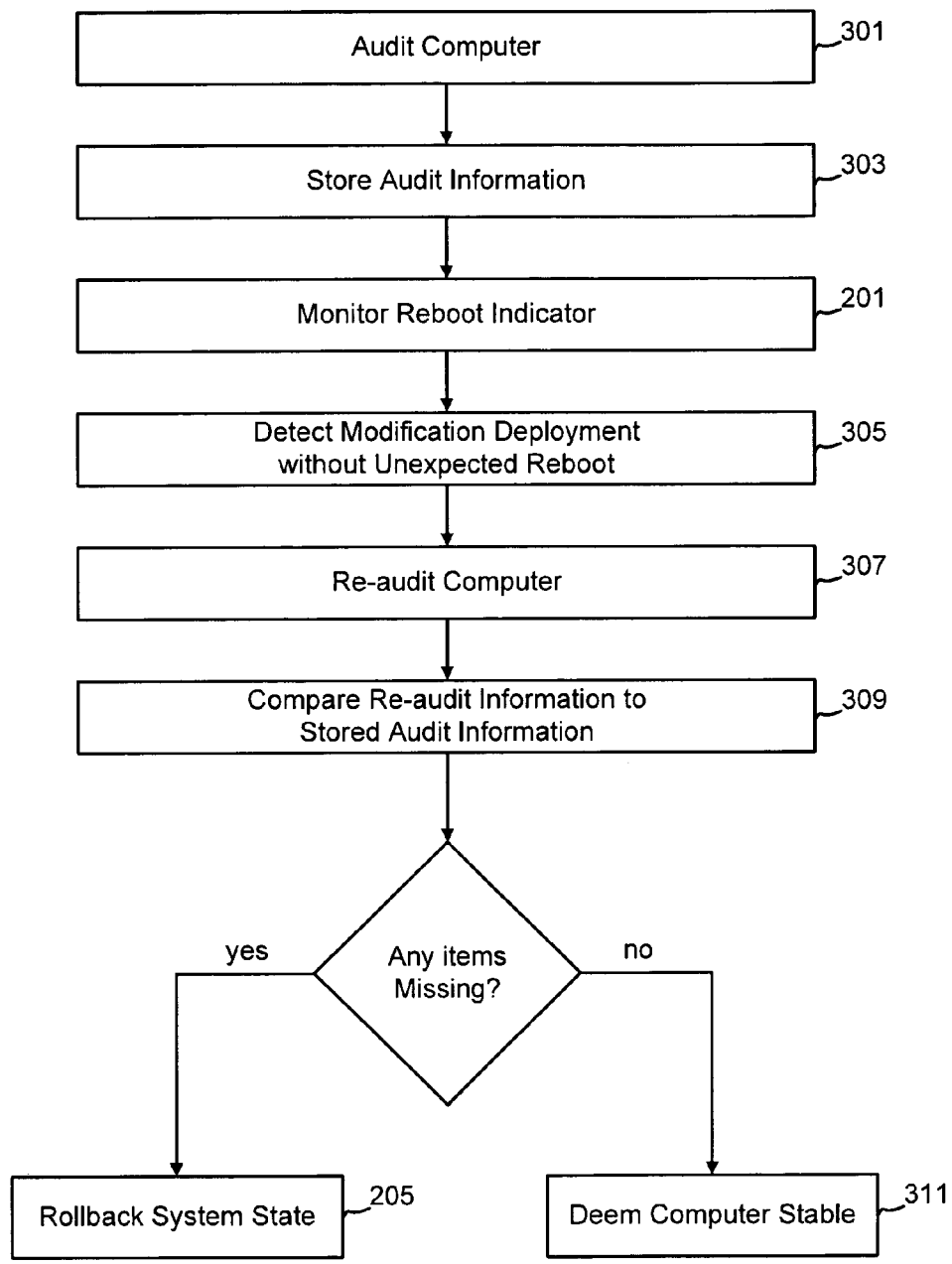
FIG. 3 is a flowchart illustrating steps for auditing the computer and processing the audit information, according to some embodiments of the present invention

Turning to FIG. 3, auditing of the computer 103 and processing of the audit information 121 are explained further, according to some embodiments of the present invention. The rollback manager 101 audits 301 the computer 103, and stores 303 audit information 121 in non-revertible storage 107, as described above. The rollback manager then monitors 201 the reboot indicator 111 in order to determine whether the deployment of a modification 113 causes an unexpected reboot. Responsive to detecting 305 deployment of a modification 113 which does not cause an unexpected reboot, the rollback manager 101 re-audits 307 the computer 103. Although the deployment did not cause an unexpected reboot, it is still desirable to determine whether all items of interest are still present on the computer 103, as the deployment might have affected one or more items of interest. Therefore, the rollback manager 101 compares 309 re-audit information to the stored audit information 121, to determine whether any items of interest are missing.

In some embodiments, responsive to the comparison revealing that at least one item from the initial audit is no longer present on the computer 103, the rollback manager 101 rolls back 205 the system state of the computer 103, according to the restore point. In some embodiments, responsive to the comparison revealing that all items of interest from the initial audit are still present on the computer 103, the rollback manager 101 deems 311 the computer 103 to be stable. Deeming 311 the computer 103 to be stable indicates that the deployment of the modification 113 was successful. Typically, this will involve the rollback manager 101 clearing the reboot indicator 111. The rollback manager 101 can then reconfigure the reboot indicator 111 as described above in conjunction with the next modification 113 deployment.

Because it can take time for items of interest (e.g., running programs) to be reconfigured and/or reactivated (e.g., reloaded) on a computer 103 after a modification 113 deployment, in some embodiments of the present invention, the rollback manager 101 waits for a specified period of time before re-auditing 307 the computer 103, and comparing 309 re-audit information to the stored audit information 121. The amount of time to wait is a design choice, and can vary from embodiment to embodiment as desired.

In other embodiments, the rollback manager 101 repeats the steps of re-auditing 307 the computer 103 and comparing 309 the re-audit information to the stored audit information 121 a specific number of times at specified time intervals, to ensure that all items of interest remain running properly under various circumstances. The number of times to repeat the re-audit and comparison, as well as the interval(s) at which to repeat them, are design choices that can vary from embodiment to embodiment, and can, for example, be specified by an administrator or the like on a default or per deployment basis.

Figure 4:
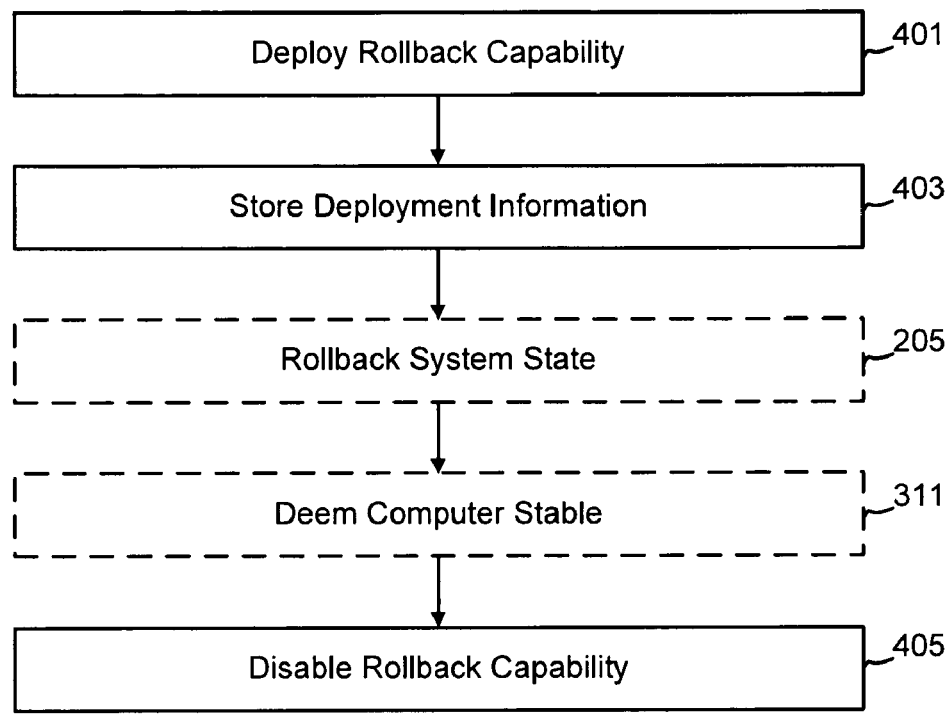
FIG. 4 is a flowchart illustrating steps for deploying and utilizing rollback capability, according to some embodiments of the present invention.

Turning now to FIG. 4, the rollback capability 109 is discussed in greater detail, according to some embodiments of the present invention. In some embodiments, rollback capability 109 is already installed on the computer, but in other embodiments it is not. Where needed, the rollback manager 101 deploys 401 rollback capability 109 on the computer 103. In such embodiments, the rollback manager 101 stores 403 information 123 concerning the deployment of the rollback capability 109 in non-revertible storage 107, as illustrated in FIG. 1. Thus, when the rollback manager 101 rolls back 205 the system state of the computer 103 or deems 311 the computer 103 stable, the rollback manager 101 can read the stored rollback capability deployment information 123, and disable 405 (e.g., uninstall) deployed rollback capability, in order to return the computer 103 to its original state as desired.

As will be understood by those familiar with the art, the invention may be embodied in other specific forms without departing from the spirit or essential characteristics thereof. Likewise, the particular naming and division of the modules, managers, features, attributes, methodologies and other aspects are not mandatory or significant, and the mechanisms that implement the invention or its features may have different names, divisions and/or formats. Furthermore, as will be apparent to one of ordinary skill in the relevant art, the modules, managers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

What is claimed is:

1. A computer implemented method for rolling back a system state after a modification failure, the method comprising:
   prior to deployment of a modification:
      creating a restore point on a computer; and
      storing initial audit information in non-revertible storage, the initial audit information representing a stable system state and comprising an enumeration of at least some items present in the system state before the deployment of the modification, the items not intended to be modified by the deployment;
   determining whether an unexpected reboot occurred during deployment of the modification;
   waiting for a specified period of time after determining that no unexpected reboot occurred during the deployment of the modification;
   after the waiting and responsive at least in part to determining that no unexpected reboot occurred during the deployment of the modification, repeating the following steps a specified number of times at specified intervals:
      determining whether a failure not involving an unexpected reboot occurred during the deployment of the modification;
      responsive to determining that a failure not involving an unexpected reboot occurred during the deployment of the modification, determining whether the computer is stable based on comparing the enumerated items in the stored initial audit information with enumerated items present in the system state after deployment of the modification to determine missing items indicating that the computer is not stable; and
      responsive to the computer not being stable, rolling back the system state of the computer according to the restore point.

2. The method of claim 1 wherein the initial audit information enumerates at least one item from a group of items consisting of:
   a currently executing system process;
   a currently executing user process; and
   a currently open listening port.

3. The method of claim 1 further comprising:
   deploying rollback capability on the computer; and
   storing, in non-revertible storage, information concerning deployment of the rollback capability on the computer; and disabling the deployed rollback capability responsive to the computer being stable.

4. The method of claim 1, further comprising:
   responsive to rolling back the system state of the computer according to the restore point, disabling a deployed rollback capability.

5. A non-transitory computer readable storage medium containing an executable computer program product for rolling back a system state after a modification failure, the computer program product comprising:
   program code for, prior to deployment of a modification:
      creating a restore point on a computer; and
      storing initial audit information in non-revertible storage, the initial audit information representing a stable system state and comprising an enumeration of at least some items present in the system state before the deployment of the modification, the items not intended to be modified by the deployment;
   program code for determining whether an unexpected reboot occurred during deployment of the modification;
   program code for waiting for a specified period of time after determining that no unexpected reboot occurred during the deployment of the modification;
   program code for, after the waiting and responsive at least in part to determining that no unexpected reboot occurred during the deployment of the modification, repeating the following steps a specified number of times at specified intervals:

determining whether a failure not involving an unexpected reboot occurred during the deployment of the modification;

responsive to determining that a failure not involving an unexpected reboot occurred during the deployment of the modification, determining whether the computer is stable based on comparing the enumerated items in the stored initial audit information with enumerated items present in the system state after deployment of the modification to determine missing items indicating that the computer is not stable; and responsive to the computer not being stable, rolling back the system state of the computer according to the restore point.

6. The computer readable medium of claim 5 wherein the initial audit information enumerates at least one item from a group of items consisting of:

a currently executing system process;
a currently executing user process; and
a currently open listening port.

7. The computer readable medium of claim 5 further comprising:

program code for deploying rollback capability on the computer; and program code for storing, in non-revertible storage, information concerning deployment of the rollback capability on the computer; and program code for disabling the deployed rollback capability responsive to the computer being stable.

8. The computer readable medium of claim 5, further comprising:

program code for, responsive to rolling back the system state of the computer according to the restore point, disabling a deployed rollback capability.

9. A computer system for rolling back a system state after a modification failure, the computer system comprising:

a non-transitory computer-readable storage medium storing executable computer program instructions for rolling back a system state after a modification failure, the computer program instructions comprising instructions for:

prior to deployment of a modification:
creating a restore point on a computer; and
storing initial audit information in non-revertible storage, the initial audit information representing a stable system state and comprising an enumeration of at least some items present in the system state before the deployment of the modification, the items not intended to be modified by the deployment;

determining whether an unexpected reboot occurred during deployment of the modification;

waiting for a specified period of time after determining that no unexpected reboot occurred during the deployment of the modification;

after the waiting and responsive at least in part to determining that no unexpected reboot occurred during the deployment of the modification, repeating the following steps a specified number of times at specified intervals:

determining whether a failure not involving an unexpected reboot occurred during the deployment of the modification;

responsive to determining that a failure not involving an unexpected reboot occurred during the deployment of the modification, determining whether the computer is stable based on comparing the enumerated items in the stored initial audit information with enumerated items present in the system state after deployment of the modification to determine missing items indicating that the computer is not stable;

responsive to the computer not being stable, rolling back the system state of the computer according to the restore point; and a processor configured to execute the computer program instructions stored on the computer-readable storage medium.

10. The computer system of claim 9 wherein the initial audit information enumerates at least one item from a group of items consisting of:

a currently executing system process;
a currently executing user process; and
a currently open listening port.

11. The computer system of claim 9, wherein the computer program instructions further comprise instructions for:

deploying rollback capability on the computer; and
storing, in non-revertible storage, information concerning deployment of the rollback capability on the computer; and disabling the deployed rollback capability.

12. The computer system of claim 9, wherein the computer program instructions further comprise instructions for:

deploying rollback capability on the computer; and
storing, in non-revertible storage, information concerning deployment of the rollback capability on the computer.

* * * * *